May 14, 1940. F. O. HOAGLAND 2,200,884
POSITIONING DEVICE FOR MACHINE TOOL TABLES
Filed Feb. 26, 1937   3 Sheets-Sheet 1
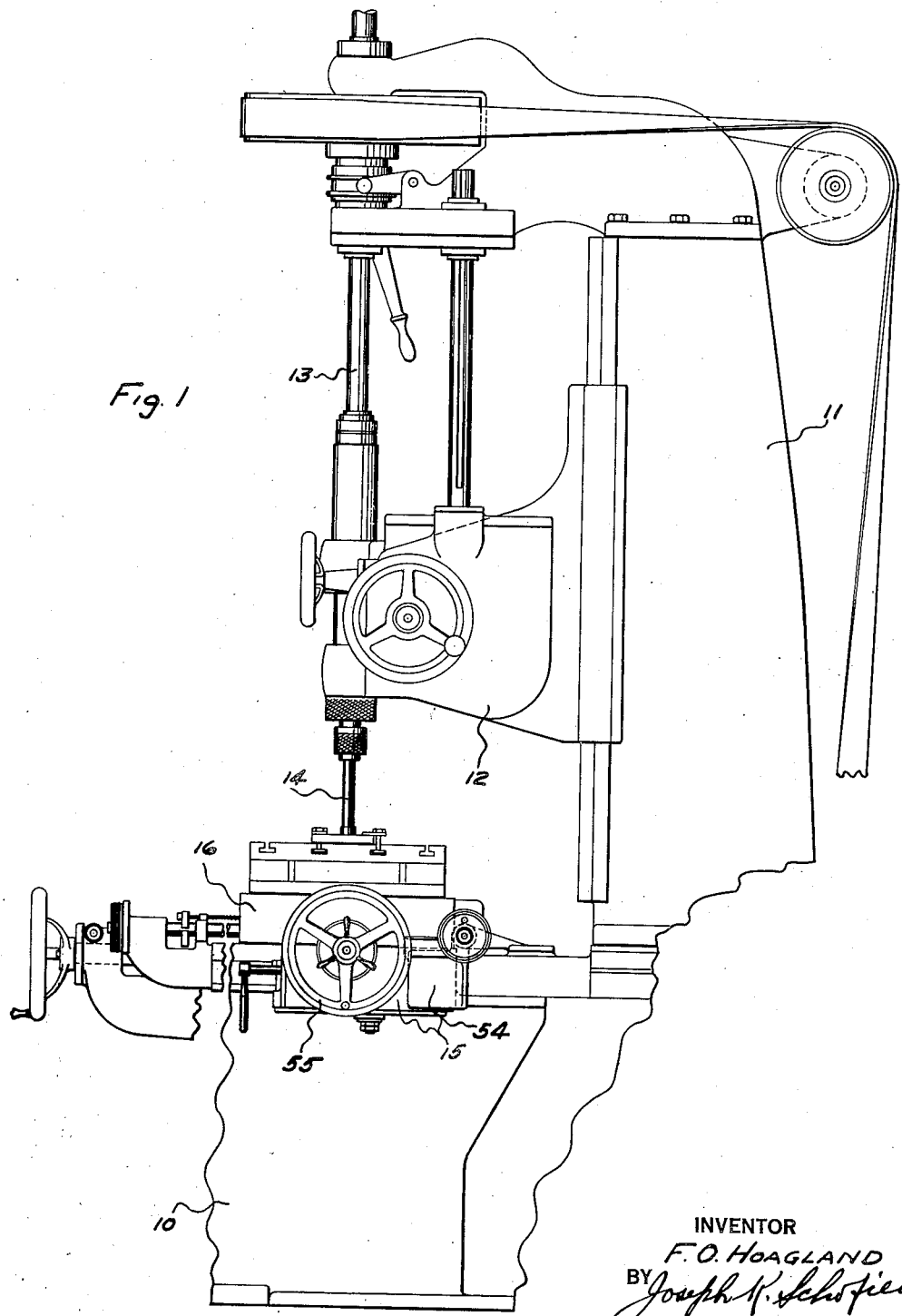
INVENTOR
F. O. HOAGLAND
BY
ATTORNEY May 14, 1940.   F. O. HOAGLAND   2,200,884
POSITIONING DEVICE FOR MACHINE TOOL TABLES
Filed Feb. 26, 1937   3 Sheets-Sheet 2
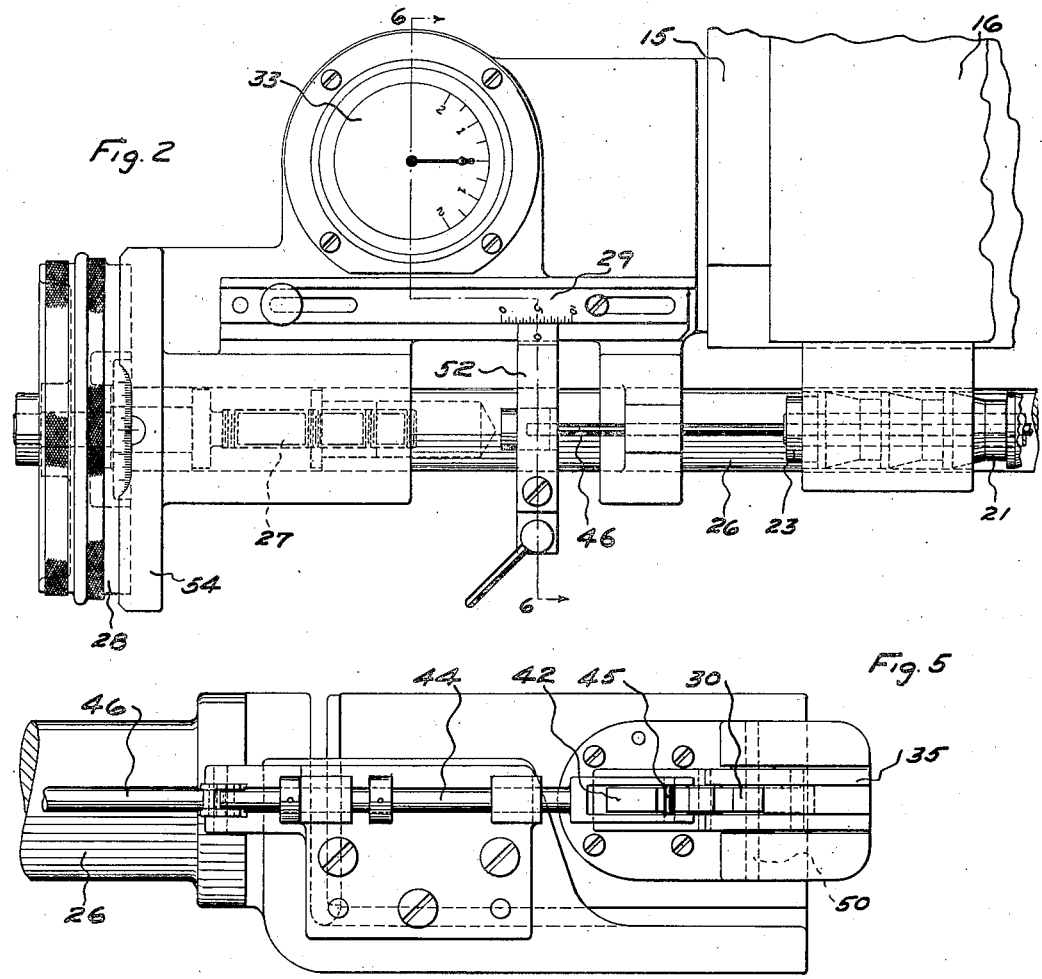
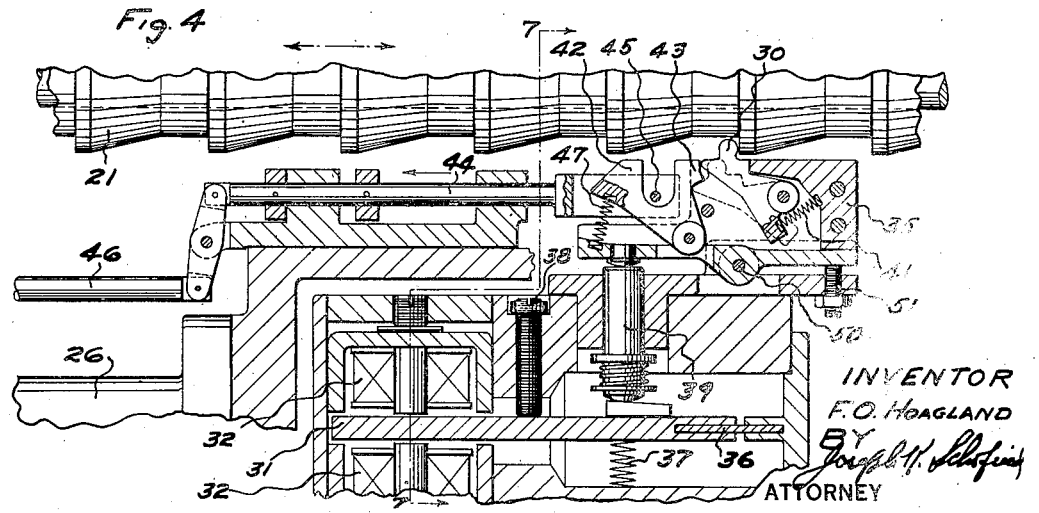
INVENTOR
F. O. HOAGLAND
BY
ATTORNEY May 14, 1940.	F. O. HOAGLAND	2,200,884
POSITIONING DEVICE FOR MACHINE TOOL TABLES
Filed Feb. 26, 1937	3 Sheets-Sheet 3
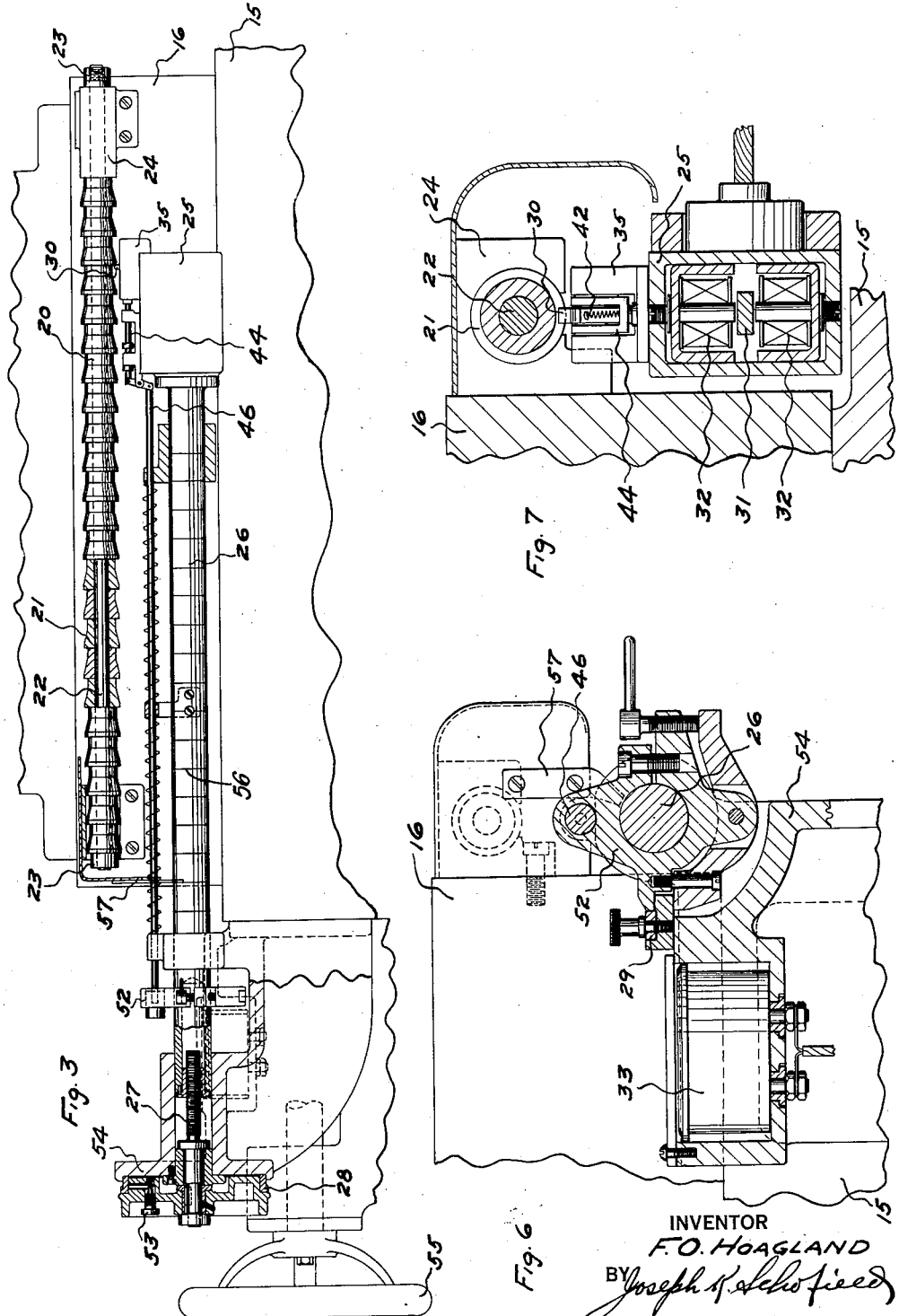
INVENTOR
F. O. HOAGLAND
BY Joseph K. Schofield
ATTORNEY Patented May 14, 1940

2,200,884

UNITED STATES PATENT OFFICE 2,200,884

POSITIONING DEVICE FOR MACHINE TOOL TABLES

Frank O. Hoagland, West Hartford, Conn., assignor to Niles-Bement-Pond Company, Hartford, Conn., a corporation of New Jersey Application February 26, 1937, Serial No. 127,973

5 Claims. (Cl. 33—181)

This invention relates to metal drilling and boring machines and particularly to a vertical machine of the above type having precision table positioning and locating means so that work pieces mounted on said table may be moved predetermined distances in a plane relative to a cutting tool.

An object of the invention is to provide improvements upon the positioning and measuring device shown in the patent to Hanson 1,323,267, granted December 2, 1919.

Another object of the invention is to permit adjustments of the movable support to be rapidly made manually to extremely precise adjustments without the possibility of injury occurring to any of the parts of the positioning mechanism.

One feature of the invention which is advantageous is that the adjusted position of the table is determined by the oscillated position of a pivotally mounted frame fixed in position relative to the part movement of which is being measured, the pivotally mounted frame having a finger portion engaging any one of a plurality of abutments formed upon a bar mounted on and movable with the member being measured.

Another feature of importance is that in the pivotally mounted frame the finger is also pivotally mounted for oscillation in the same direction as the frame so that the finger may move to an inoperative position beyond its gaging or operative position to permit passage of the table beyond predetermined positions for which the measuring means are adjusted, this added movement being without injury to the finger or parts associated therewith.

And finally it is an object of the invention to provide the abutments on the bar for engagement by the finger made up of short blocks having their parallel opposite end faces equally spaced apart and the entire number of blocks being clamped in alinement with each other preferably on the lower surface of the movable table the successive positions of which are to be measured.

With the above and other objects in view, the invention may include the features of construction and operation set forth in the following specification and illustrated in the accompanying drawings.

In the accompanying drawings annexed hereto and forming a part of this specification, I have shown the invention embodied in a vertical boring and milling machine but it will be understood that the invention can be otherwise embodied and that the drawings are not to be construed as defining or limiting the scope of the invention, the claims appended to this specification being relied upon for that purpose.

In the drawings:

Figure 1 is a side elevation of a machine showing the present invention applied thereto.

Fig. 2 is a partial plan view on an enlarged scale of the adjusting and positioning mechanism for a movable table and the indicating means therefor.

Fig. 3 is a fragmentary side elevation of the table positioning mechanism showing the abutment bar secured in position on the table, the means for adjusting the contacting mechanism and the finger carried by the contacting mechanism being shown in measuring position.

Fig. 4 is a side elevation in section of the contact mechanism shown with the finger in operative engagement with one of the abutments on the bar and also in its retracted inoperative position.

Fig. 5 is a plan view of the mechanism shown in Fig. 4, the abutment bar being omitted.

Fig. 6 is a sectional view of the positioning mechanism taken on the planes of broken line 6—6 of Fig. 2, and Fig. 7 is a sectional view taken on the planes of broken line 7—7 of Fig. 4.

Briefly, and in its preferred aspect, the invention may include the following principal parts: First, an abutment bar mounted on the member, movements and positions of which are being measured and indicated, this bar extending parallel to the direction of movement of the member and the abutments being equally spaced along the bar; second, a contacting member longitudinally adjustable within the support for the movable member or table, the direction of adjustment of this contacting member being parallel to the direction of movement of the member being positioned; third, a pivotally mounted member in said adjustable contacting member having a small abutment engaging finger thereon; fourth, an armature in said adjustable member movable between induction coils of an electric circuit; fifth, an indicating instrument operated by said circuit to determine when said contacting member is in its gaging or measuring position; and sixth, means to accurately adjust and determine the position of the contacting member.

Referring in detail to the figures of the drawings, there is shown a vertical type precision boring machine having a base 10, a column 11 and a tool head 12. Within the head 12 is a rotatable tool spindle 13 on which may be mounted a boring or other tool 14 at its lower end. As these members of the machine form no part of the present invention, further description is not thought to be necessary. Means are provided to rapidly rotate the tool 14 and to feed the spindle 13 and tool 14 slowly up or down.

On the base 10 there is mounted a saddle 15 movable horizontally toward and from the column 11 on suitable ways. On the upper surface of the saddle 15 is a table 16 movable along suitable ways on the saddle in a direction at right angles to the direction of movement of the saddle 15. The primary object of the invention is to determine precisely the distances moved by the saddle 15 along the base 10 and of the table 16 along the saddle 15. As the mechanism for moving and determining the precise length of movements between settings of the saddle and table are similar to each other, but one of these mechanisms will require description of its detail parts.

Referring to Fig. 3, it will be seen that an abutment bar or rod 20 is mounted along one side of the table 16 parallel to its direction of movement relative to the saddle 15. As shown in this figure the bar or rod 20 is made up of a plurality of short blocks 21 having flat parallel end surfaces identical distances apart. These individual blocks are held together by a central tie rod 22 having nuts 23 threaded thereon at opposite ends. Preferably the rod 22 passes through a bracket 24 on the table 16 in which the bar 21 is secured against axial movement. The opposite end of the bar may rest within a suitable opening in a manner to permit free elongation and contraction of the bar.

Below the bar 20 and mounted for adjustment short distances in the direction of movement of the table 16 is the contacting device 25. This device is mounted upon the inner end of a long rod 26 slidably mounted within the saddle 15 as will be more fully described hereinafter. At the outer or forward end of this bar 26 there is provided an accurately threaded nut engaging the threaded spindle 27 of a micrometer 28. The micrometer 28 has a large diameter graduated dial to determine the rotary adjustment of the dial. Preferably a small scale 29 on the saddle 15 (see Fig. 2) is provided to facilitate reading of the approximate position of the contacting member 25. For convenience in making preliminary adjustments, the scale 29 may be secured in adjusted longitudinal positions.

The contacting member 25 is so positioned by its bar 26 relative to the table 16 and the bar 20 that each one of the abutment surfaces on the blocks 21 may engage the contact finger 30 when the table 16 is moved from one extreme position to the other. It is the critical position of the finger 30 that determines when the positioning of the table 16 has been brought to the exact predetermined position.

The contacting device 25 has a pivotally mounted member 35 therein so that this member may oscillate through a small angle. Movable with oscillatory movements of the pivotally mounted member 35 is an armature 31 disposed between closely adjacent induction coils 32. These coils 32 are in an electric circuit which also includes an electric indicating instrument 33 conveniently mounted for observation by the operator and having a movable pointer passing over a scale. The circuit forms no part of the present invention so will not be described. It will suffice to say that with the armature disposed midway between the coils 32 the pointer of the instrument 33 will be at its zero or central position. Slight variations of the armature 31 from its mid position will vary the position of the pointer of the instrument 33 over its scale.

As shown in Fig. 4, the armature 31 is flexibly mounted at one end by a flexible strip 36 and is lightly pressed upward by a suitable spring 37 against an adjustable threaded stop 38. Between the contacting device 35 and the armature 31 is interposed a stud 39 resting upon the armature 31 and having its upper end in contact with a portion of the contacting device.

Within the contacting device 35 is pivotally mounted the small finger 30 extending above the contacting device 35. This finger 30 in its raised or operative position engages against an end surface of one of the abutments 21. This finger also is normally held in its operative position by means of a light spring 41, strong enough, however, to cause the pivotal member 35 to oscillate and vary the position of the armature before permitting the finger 30 to oscillate about the axis of pivot into its retracted position.

As the table 16 and the abutment bar 21 have to move past the finger 30 when adjustments of the table 16 to different positions are made and the table may accidentally be moved beyond the desired position for which the mechanism may be adjusted, the finger 30 is movable to an inoperative retracted position. When moved to its depressed or inoperative position the finger 30 may be held retracted until the table 16 has been moved approximately to its new position. This retaining means includes a second pivotally mounted member 42 in the contacting device 35 having a latching portion 43 adjacent the finger 30. When the finger 30 is oscillated to its retracted position a forward projection on the finger 30 engages below latching portion 43 of the second pivotal member 42. Until the member 42 is manually moved to release the finger 30 the table 16 may be moved freely to any position and in either direction without the finger striking against the abutments 21. When the finger 30 is to be released the member 42 is retracted by means of a rod 44 having a cross pin 45 loosely engaging within a recess in the member 42. To move this rod 44 an elongated rod 46 is connected thereto, as shown in Fig. 4, which extends to the front surface of the machine. As soon as this rod 46 is pushed manually inward a short distance the member 42 is oscillated to the left as seen in Fig. 4 and the finger 30 is then released for oscillatory movement into engagement with an abutment. To press the member 42 normally in a direction to lock the finger 30 in retracted position when depressed, a light spring 47 is provided.

The contacting device 35 is pivotally mounted upon the axis 50 and may be weighted on one side of the axis so that until the finger 30 engages one of the blocks 21 the right hand portion as seen in Fig. 4 rests against an adjustable stop 51. Movement of the table 16 to the predetermined position for which the positioning mechanism is adjusted is always made toward the left, as the parts are seen in Fig. 4. This movement of the table 16 and bar 21 as the table is brought into its final position serves to oscillate the member 35 and the finger 30 about the axis 50, thus moving the armature downward against the pressure of spring 37.

In operation the measuring devices are set in a "zero" position for any initial position of the table 16. With the table 16 in an initial position the scale 29 is adjusted longitudinally so that one end of its scale is opposite the zero line on an arm 52 outstanding from and moving with the contacting device 25 and its adjusting rod 26. The graduated dial of the micrometer 28 is then angularly adjusted and locked by its clamping screw 53 so that its zero will be opposite a zero line on the bracket 54 within which the screw 27 is supported. To move the table 16 a predetermined precise distance the table 16 is first moved approximately the desired distance. This may be done by counting the turns of the hand wheel 55 for the positioning screw for the table (not shown) or by any other desired means. The rod 26 for this purpose preferably may be provided with equally spaced circumferential grooves 56. A pointer 57 mounted on a part moving with the table 16 enables the position of the table to be approximately determined. The graduated dial 28 and screw 27 are then rotated so that the scale 29 and graduation on the dial indicate the fractional part of an inch of the desired length of movement desired. The rod 46 is then pushed inward to release the contactor finger 30 after which the hand wheel 55 is rotated slowly until the table 16 is moved to its critical or predetermined position. This position is indicated by the pointer on the indicating instrument 33 moving to its central or zero position when the armature 31 is moved slightly downward by oscillation of the pivotally mounted member 35 and the finger 30 about the axis 50.

What I claim is:

1. A table positioning means for machine tools comprising in combination, a base, a table thereon, means to move said table along said base, a bar on said table extending in the direction of movement thereof, said bar having a plurality of spaced abutments, a pivotal frame slidably mounted in said base, a finger pivotally supported in said pivotal frame and in position to engage an abutment, means to bodily move said frame and finger in the direction of movement of said table, and means to determine when said frame and finger are in a predetermined adjusted position within said base with said finger engaged by one of said abutments, said finger being movably mounted within its frame for movement to an inoperative position.

2. A table positioning means for machine tools comprising in combination, a base, a table thereon, means to move said table along said base, a bar on said table extending in the direction of movement thereof, equally spaced abutments on said bar, a pivotally supported member within said base, a finger pivotally mounted in said member for engagement with any of said abutments, said member and finger being movable in the direction of movement of said table, means to adjust the position of said member longitudinally to predetermined positions in a direction parallel to said bar, and means to indicate when said table is in a predetermined position with said pivotally mounted member in contact with one of said abutments and in a predetermined tilted position.

3. A table positioning means for machine tools comprising in combination, a base, a table thereon, means to move said table, a bar on said table extending in the direction of movement thereof, equally spaced abutments on said bar, a pivotal member supported in said base having a movable member in position to engage any of said abutments, micrometer adjusting means for said pivotal member whereby the position of said member in a direction parallel to said bar may be determined, and means to indicate when said pivotal and movable members are in measuring position.

4. A positioning device for movable members comprising in combination, a bar on the member to be moved provided with spaced abutments, a finger adapted to engage one of said abutments when said member is in a predetermined position, a pivotal frame slidably mounted within the base and within which said finger is supported, and means to bodily move said frame and finger predetermined distances in the direction of movement of said member, said finger being depressed to and retained in a retracted inoperative position when said member is moved beyond a predetermined position, and manual releasing means for said finger.

5. A positioning device for movable members comprising in combination, a bar on the member to be moved provided with spaced abutments, a pivotally mounted finger adapted to engage one of said abutments when said member is in a predetermined position, a pivotal frame slidably mounted within the base and within which said finger is pivotally mounted, means to bodily move said frame and finger predetermined distances in the direction of movement of said member, said finger being oscillated to an inoperative position within said frame when said member is moved beyond the position for which the frame is set, means to retain said pivotal finger in its inoperative position, and manual means to release said finger for movement to its operative position.

FRANK O. HOAGLAND.